United States Patent
Kim et al.

(10) Patent No.: US 10,785,788 B2
(45) Date of Patent: Sep. 22, 2020

(54) METHOD FOR TRANSMITTING UPLINK SIGNAL FROM UE IN WIRELESS COMMUNICATION SYSTEM AND APPARATUS FOR SUPPORTING THE SAME

(71) Applicant: LG Electronics Inc., Seoul (KR)

(72) Inventors: Seonwook Kim, Seoul (KR); Suckchel Yang, Seoul (KR); Joonkui Ahn, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/248,365

(22) Filed: Jan. 15, 2019

(65) Prior Publication Data

US 2019/0150174 A1    May 16, 2019

Related U.S. Application Data

(63) Continuation of application No. PCT/KR2018/009159, filed on Aug. 10, 2018.
(Continued)

(51) Int. Cl.
*H04W 52/36* (2009.01)
*H04W 72/12* (2009.01)
(Continued)

(52) U.S. Cl.
CPC .......... *H04W 72/1268* (2013.01); *H04L 1/00* (2013.01); *H04L 5/0053* (2013.01); *H04L 5/0082* (2013.01); *H04L 25/02* (2013.01); *H04W 72/1289* (2013.01); *H04W 88/06* (2013.01); *H04L 5/001* (2013.01); *H04L 5/0023* (2013.01); *H04L 5/0048* (2013.01); *H04L 5/14* (2013.01)

(58) Field of Classification Search
None
See application file for complete search history.

(56) References Cited

U.S. PATENT DOCUMENTS 10,523,389 B2 * 12/2019 Dinan ................. H04W 52/146
10,523,390 B2 * 12/2019 Dinan ................. H04W 72/04
(Continued)

FOREIGN PATENT DOCUMENTS

WO    2016036141 A1    3/2016

OTHER PUBLICATIONS

Panasonic, "Discussion on uplink control channel structure in short-duration", 3GPP TSG RAN WG1 Meeting #89, May 15-19, 2017, R1-1708086.
(Continued)

*Primary Examiner* — Sithu Ko
(74) *Attorney, Agent, or Firm* — Dentons US LLP

(57) ABSTRACT

The present invention discloses a method for transmitting or receiving ACK information between a UE and a BS in a wireless communication system and an apparatus for supporting the same. According to one embodiment applicable to the present invention, the UE may transmit a first type channel configured with 1 or 2 symbols and a second type channel configured with 4 or more symbols by configuring a transient period between first type channel transmission and second type channel transmission within a time period corresponding to the second type channel if the first type channel and the second type channel are continuous in a time domain.

10 Claims, 21 Drawing Sheets

Related U.S. Application Data

(60) Provisional application No. 62/543,963, filed on Aug. 10, 2017.

(51) Int. Cl.
*H04W 88/06* (2009.01)
*H04L 1/00* (2006.01)
*H04L 25/02* (2006.01)
*H04L 5/00* (2006.01)
*H04L 5/14* (2006.01)

(56) References Cited

U.S. PATENT DOCUMENTS

| | | | | |
|---|---|---|---|---|
| 2013/0272230 | A1* | 10/2013 | Dinan | H04W 52/18 370/329 |
| 2015/0031410 | A1* | 1/2015 | Lim | H04W 52/146 455/522 |
| 2017/0272299 | A1* | 9/2017 | Chae | H04J 11/00 |
| 2017/0295589 | A1* | 10/2017 | Sundararajan | H04W 74/002 |
| 2018/0167965 | A1* | 6/2018 | Wang | H04L 1/0006 |
| 2018/0206226 | A1* | 7/2018 | Zeng | H04W 72/0446 |
| 2018/0220441 | A1* | 8/2018 | Akula | H04W 72/1268 |
| 2018/0262998 | A1* | 9/2018 | Park | H04W 52/365 |
| 2018/0278393 | A1* | 9/2018 | Akula | H04L 5/0051 |
| 2018/0343148 | A1* | 11/2018 | Hosseini | H04W 52/346 |
| 2019/0045498 | A1* | 2/2019 | Huang | H04B 1/713 |

OTHER PUBLICATIONS

LG Electronics, "Support of uplink channel multiplexing for NR", 3GPP TSG RAN WG1 NR Ad-Hoc#2, Jun. 27-30, 2017, R1-1710321.

Panasonic, "Discussion on UCI on PUSCH", 3GPP TSG RAN WG1 NR Ad-Hoc#2, Jun. 27-30, 2017, R1-1710939.

Ericsson, "Time masks and transmission templates for the eLAA UL", TSG-RAN Working Group 4 (Radio) meeting #82, Feb. 13-17, 2017, R4-1700796.

R4-1704839, XP051277032: 3GPP TSG-RAN WG4 Meeting #83, Hangzhou, China, May 15-19th, 2017, Ericsson, "UE On/Off mask," (9 Pages).

R4-1704840, XP051277033: 3GPP TSG-RAN WG1 Meeting #83, Hangzhou, China, May 15-19th, 2017, RAN4 "Reply LS to RAN1 on implication of sTTI operation on UL On/Off time mask," (6 Pages).

R4-1706122, XP051286575: 3GPP TSG-RAN WG4 Meeting #83, sTTI: UE On/Off Mask, List of use cases, downloaded by EPO on May 23, 2017, Ericsson (10 Pages).

R4-1706809, XP051302851: 3GPP TSG-RAN WG4 Meeting NR#2, Qingdao, China, Jun. 27-29, 2017, Ericsson, "Use cases On/Off mask for NR UE transmissions," (3 Pages).

* cited by examiner

* Transient period is only specifed in the case of frequency hopping or a power change between SRS symbols (a)                                    (b)

METHOD FOR TRANSMITTING UPLINK SIGNAL FROM UE IN WIRELESS COMMUNICATION SYSTEM AND APPARATUS FOR SUPPORTING THE SAME

This application is a continuation of International Application No. PCT/KR2018/009159 filed on Aug. 10, 2018, and claims priority to U.S. provisional application No. 62/543,963 filed on Aug. 10, 2017, all of which are hereby incorporated by reference in their entireties as if fully set forth herein.

TECHNICAL FIELD

The following description, relates to a wireless communication system, and more particularly, to a method for transmitting an uplink signal from a user equipment (UE) in a wireless communication system and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention is to provide a method for transmitting an uplink signal from a user equipment (UE) in a wireless communication system and an apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting or receiving ACK information between a UE and a BS in a wireless communication system and an apparatus for supporting the same.

In one aspect of the present invention, a method for transmitting an uplink signal a user equipment (UE) to a base station (BS) in a wireless communication system comprises transmitting a first type channel configured with (or comprised of) 1 or 2 symbols and a second type channel configured with 4 or more symbols by configuring a transient period between first type channel transmission and second type channel transmission within a time period corresponding to the second type channel when the first type channel and the second type channel are continuous in a time domain.

In another aspect of the present invention, a user equipment (UE) for transmitting an uplink signal to a base station (BS) in a wireless communication system comprises a transmitter; and a processor operated by being connected with the transmitter, wherein the processor is configured to transmit a first type channel configured with (or comprised of) 1 or 2 symbols and a second type channel configured with 4 or more symbols by configuring a transient period between first type channel transmission and second type channel transmission within a time period corresponding to the second type channel when the first type channel and the second type channel are continuous in a time domain.

In the above configuration, the first type channel may correspond to a channel which is prior to or follows the second type channel in the time domain.

For example, the UE may transmit the first type channel by configuring an ending point of a transmission ON power of the first type channel to a boundary between the first type channel and the second type channel when the first type channel is prior to the second type channel in the time domain.

For another example, the UE may transmit the first type channel by configuring a starting point of a transmission ON power of the first type channel to a boundary between the first type channel and the second type channel when the first type channel follows the second type channel in the time domain.

Also, in the above configuration, the transient period between the first type channel transmission and the second type channel transmission may be configured within one symbol, which is positioned at a boundary between the first type channel and the second type channel and corresponds to the second type channel.

Also, the UE may transmit the second type channel and a sounding reference signal (SRS) by configuring additional transient period between the second type channel transmission and SRS transmission within additional time period corresponding to the second type channel when the first type channel is prior to the second type channel in the time domain and the UE transmits the SRS subsequently to the second type channel.

In the present invention, the first type channel may correspond to a Physical Uplink Control Channel (PUCCH) configured with 1 or 2 symbols.

Also, the second type channel may correspond to a Physical Uplink Control Channel (PUCCH) or a Physical Uplink Shared Channel (PUSCH) configured with 4 or more symbols.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a UE may protect a transmission duration of a channel (e.g., PUCCH comprised of 1 or 2 symbols) comprised of 1 or 2 symbols within a maximum range, whereby transmission reliability of the channel comprised of 1 or 2 symbols may be enhanced.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
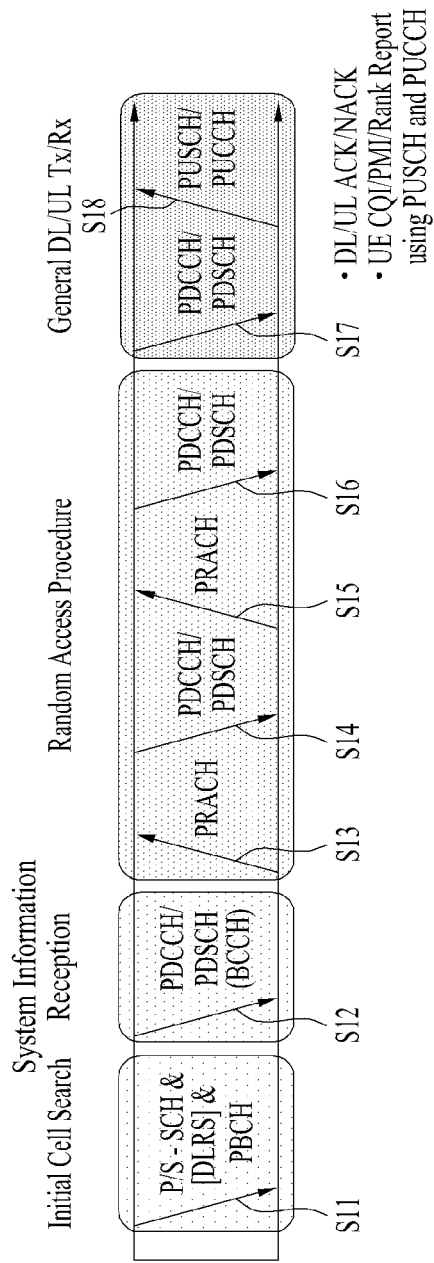
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For clarification of description for technical features of the present invention, although the embodiments of the present invention will be described based on a 3GPP NR system as well as a 3GPP LTE/LTE-A system, the present invention may be applied to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
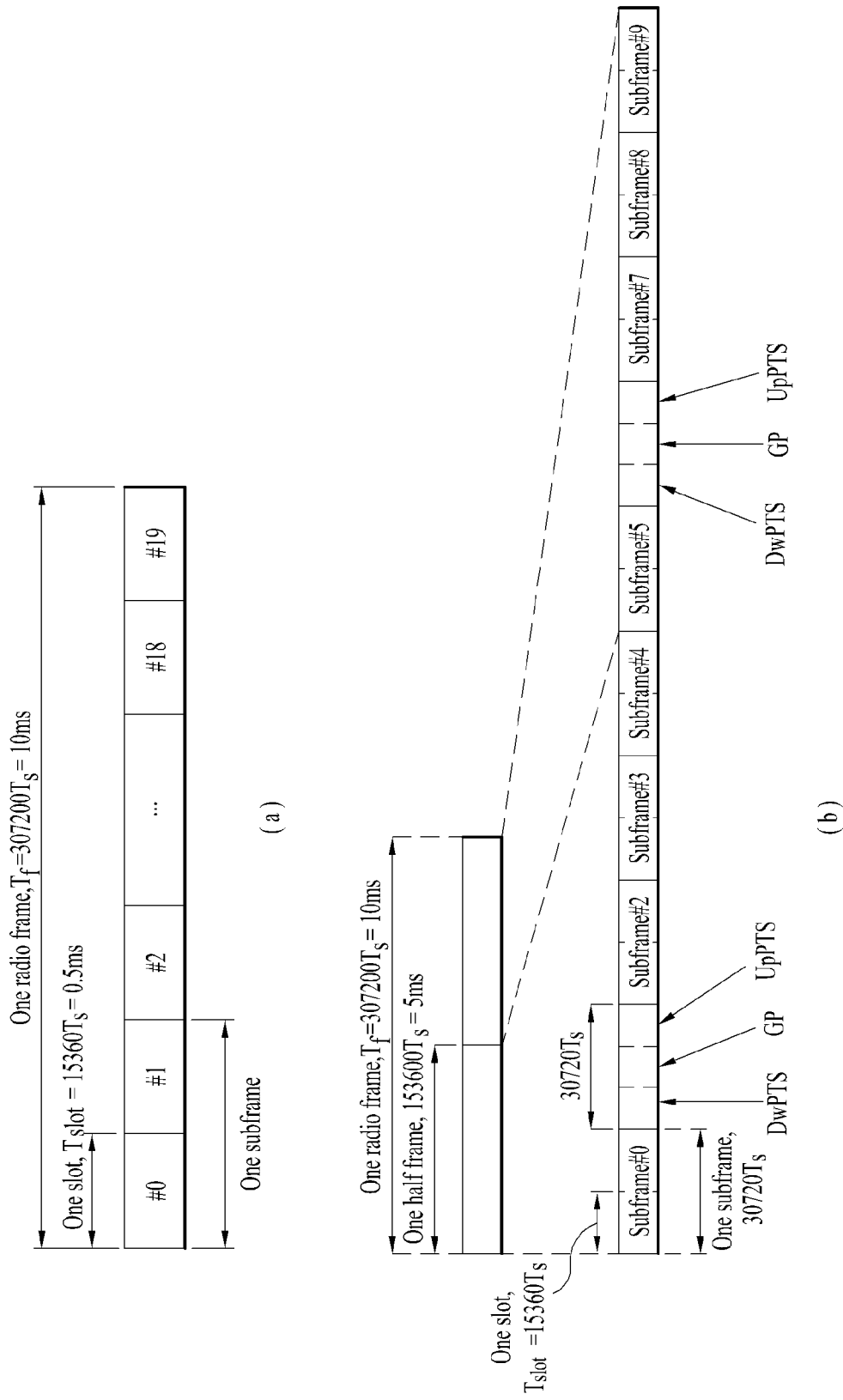
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns).

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

|  | Normal cyclic prefix in downlink | | | Extended cyclic prefix in downlink | | |
|---|---|---|---|---|---|---|
|  |  | UpPTS | | | UpPTS | |
|  |  | Normal | Extended |  |  |  |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ |  |  | 20480 · $T_s$ |  |  |
| 2 | 21952 · $T_s$ |  |  | 23040 · $T_s$ |  |  |
| 3 | 24144 · $T_s$ |  |  | 25600 · $T_s$ |  |  |
| 4 | 26336 · $T_s$ |  |  | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ |  |  |
| 6 | 19760 · $T_s$ |  |  | 23040 · $T_s$ |  |  |
| 7 | 21952 · $T_s$ |  |  | — | — | — |
| 8 | 24144 · $T_s$ |  |  | — | — | — |

One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

A frame structure type 3 may only be applied to a licensed assisted access (LAA) SCell which is a normal cyclic prefix. Each radio frame has a length of $T_f=307200 \cdot T_s=10$ ms and includes 20 slots of $T_{slot}=15360 \cdot T_s=0.5$ ms length. At this time, each slot is numbered from 0 to 19. If an index of one subframe is i, the subframe i is defined as two continuous slots corresponding to slot indexes 2i and 2i+1.

The 10 subframes within one radio frame are available for DL or UL transmission. DL transmission occupies one or more continuous subframes starting anywhere within one subframe and ending at the last subframe that follows one of fully occupied interval and DwPTS interval of Table 2. UL transmission occupies one or more continuous subframes.

Figure 3:
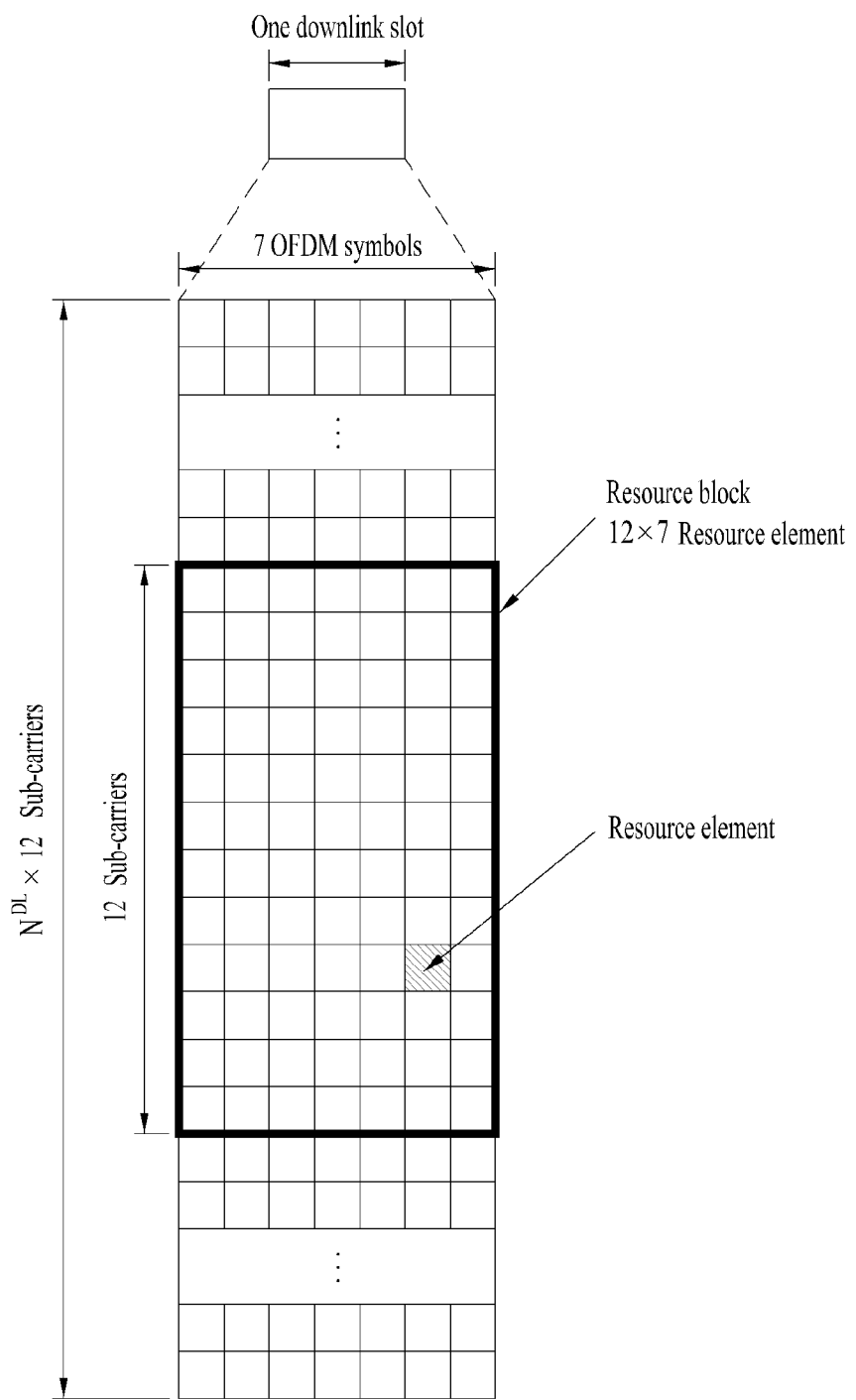
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
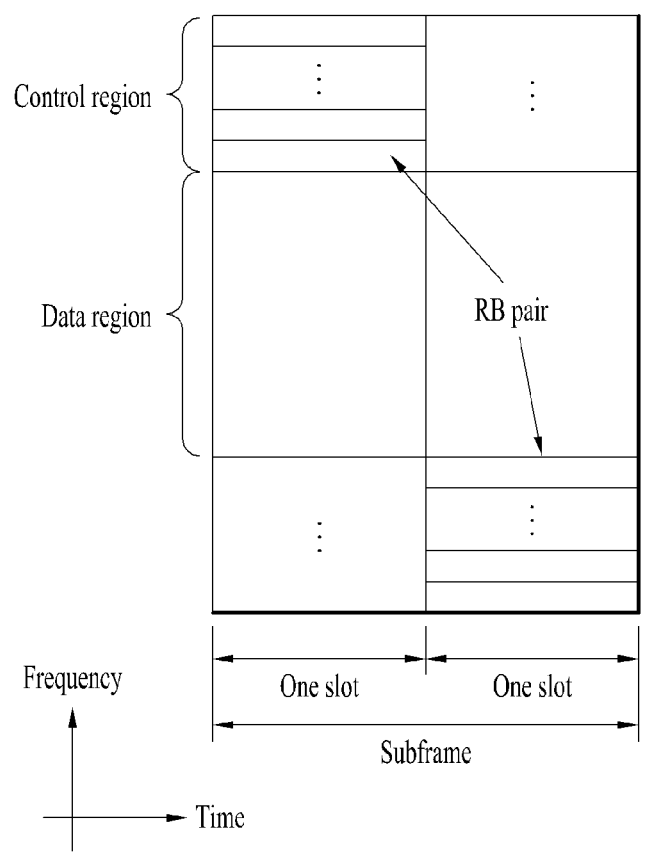
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
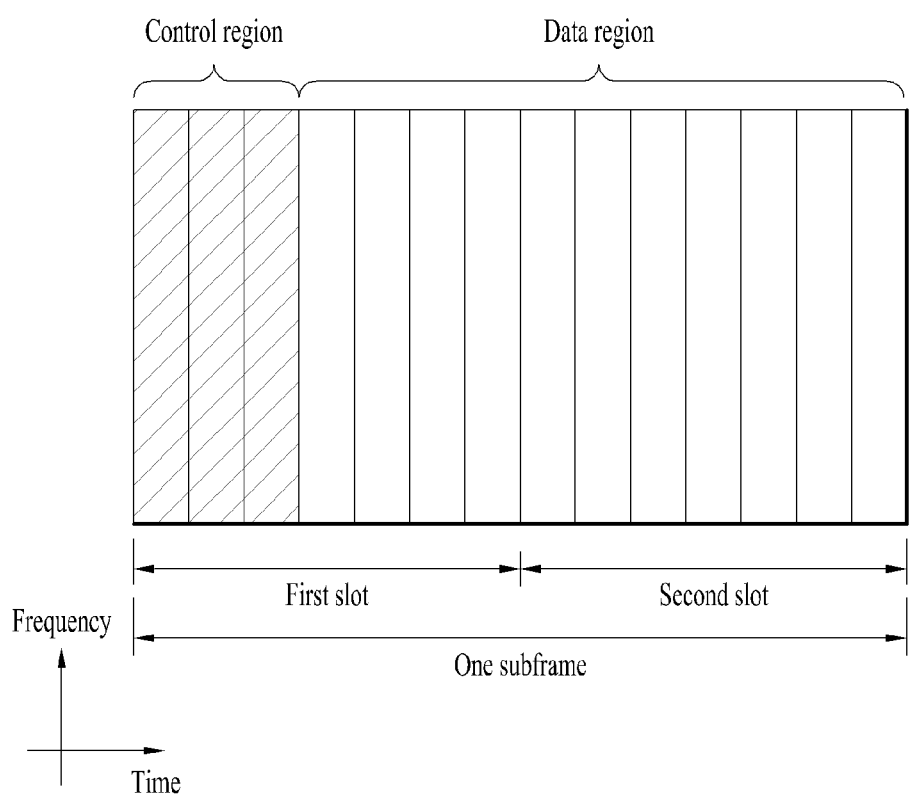
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. ON/OFF Time Mask

Transmitters require a certain time for typically turning-on and turning-off an output power. This means that turning-on and turning-off of the output power do not occur immediately. Moreover, rapid transition between the ON state and the OFF state may cause that unwanted signals on neighboring carriers are radiated (that is, unnecessary radiation). This unnecessary radiation should be limited to a specific level. Therefore, a transient period which is a switching period of the transmitter from OFF state to ON state or vice versa exists. Also, in case of an uplink, power allocation is configured differently per subframe depending on a physical layer channel (or signal) such as PUSCH, PUCCH and SRS. Likewise, a transient period exists even in the case that a power difference between continuous channels occurs.

Hereinafter, ON/OFF time mask will be described with reference to FIG. 6.

Figure 6:
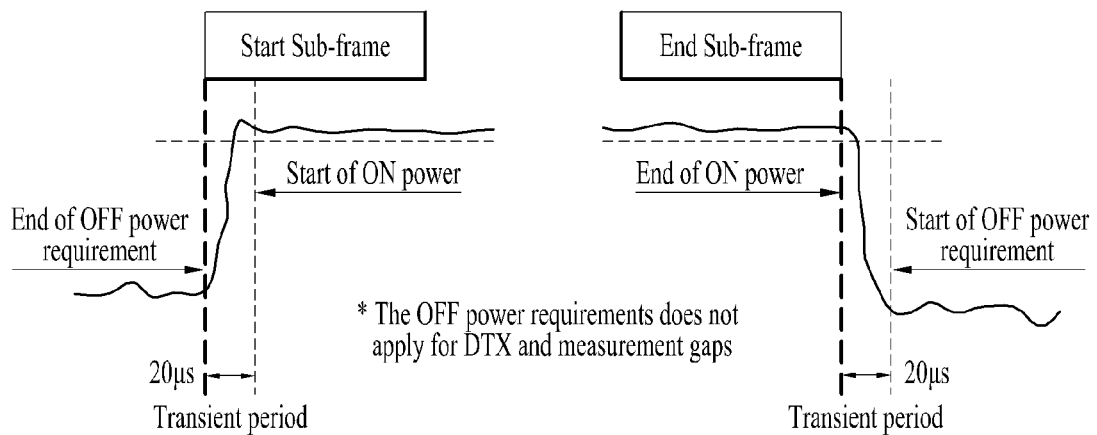
FIG. 6 is a diagram illustrating general ON/OFF time masks for a frame structure type 1 and a frame structure type 2.

FIG. 6 is a diagram illustrating general ON/OFF time masks for a frame structure type 1 and a frame structure type 2.

Referring to FIG. 6, the general ON/OFF time masks for the frame structure type 1 and the frame structure type 2 are defined as a period observed when an output power from OFF power to ON power is turned on and a period observed when an output power from ON power to OFF power is turned off. These ON/OFF time masks may occur at DTX (Discontinued Transmission) period and a measurement gap, and during start or end of adjacent/non-adjacent transmission.

An OFF power measurement period is defined as a period of at least one subframe except a transient period. Also, ON power is defined as an average power for a period except a transient period within one subframe. In this case, respective OFF power and ON power requirements should be satisfied at the OFF power period and the ON power period, but requirements for an uplink transmission power at the transient period are not defined.

In the following description, although it is assumed that micro-second (s) is consumed for the transient period between ON and OFF, the transient period is a maximum duration which is allowed, and faster ON/OFF switching may be performed depending on implementation of a UE.

A transient period length should not be longer than specific values of the following Table.

TABLE 3

| TTI pattern | Channel BW (MHz) | TTI Duration | Transient period length (µs) |
|---|---|---|---|
| Subframe TTI | | 1 ms | 20 |
| Slot TTI | 1.4 | 1 slot | 20 |
| | >1.4 | 1 slot | 10 |
| Subslot TTI | 1.4 | 2 os or 3 os | 20 |
| | >1.4 | 2 os or 3 os | 10 |

Figure 7:
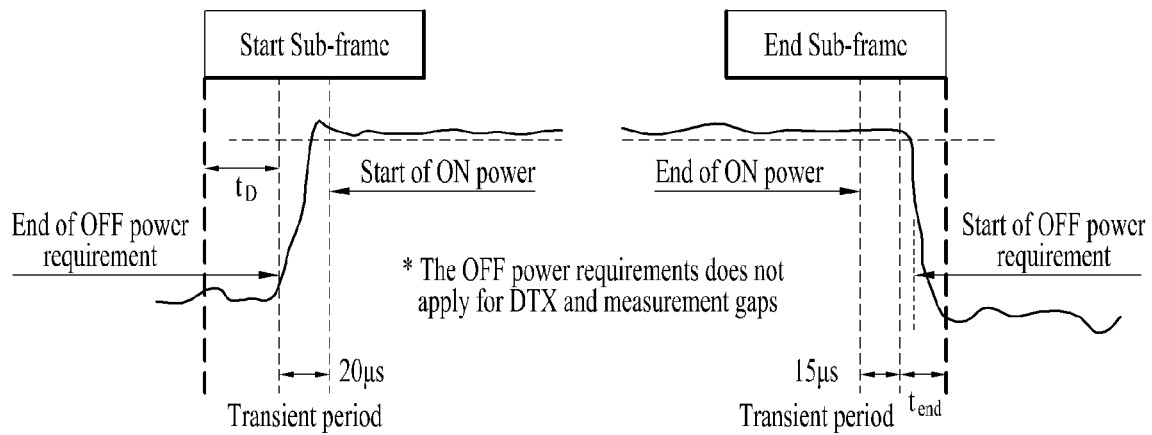
FIG. 7 is a diagram illustrating a general ON/OFF time mask for a frame structure type 3.

FIG. 7 is a diagram illustrating a general ON/OFF time mask for a frame structure type 3.

As shown in FIG. 7, in the general ON/OFF time mask for the frame structure type 3, a PUSCH start position is relatively modified as much as $t_D = N_{start}^{FS3} T_s$ in comparison with a start of a subframe indicated by related DCI. In this case, as defined in the 3GPP TS 36.211, $N_{start}^{FS3}$ is determined in accordance with the following Equation and a basis time unit $T_s$ is expressed as Ts=1/(15 kHz×2048)=3.2552× 10−8(약 33 ns)와 같다.

[Equation 1]
$$N_{start}^{FS3} = \begin{cases} 768 & \text{if the associated } DCI \text{ indicates } PUSCH \text{ starting position '01'} \\ 768 + N_{TA} & \text{if the associated } DCI \text{ indicates } PUSCH \text{ starting position '10'} \\ N_{CP,0} + N & \text{if the associated } DCI \text{ indicates } PUSCH \text{ starting position '11'} \end{cases}$$

In this case, NTA denotes a Timing Advance (TA) value for the UE, and NCP,0 denotes 160 in case of normal CP and 512 in case of extended CP, and N=2048.

As specified in the 3GPP TS 36.212, if bits indicating PUSCH end symbols included in related DCI indicate '0' and '1', respectively, tend values at the end of the subframe correspond to 0 and Tsymb, respectively. In this case, Tsymb denotes a length of the last SC-FDMA symbol. OFF mask requirements are applied after 5 us from the end of the last symbol which is transmitted.

Figure 8:
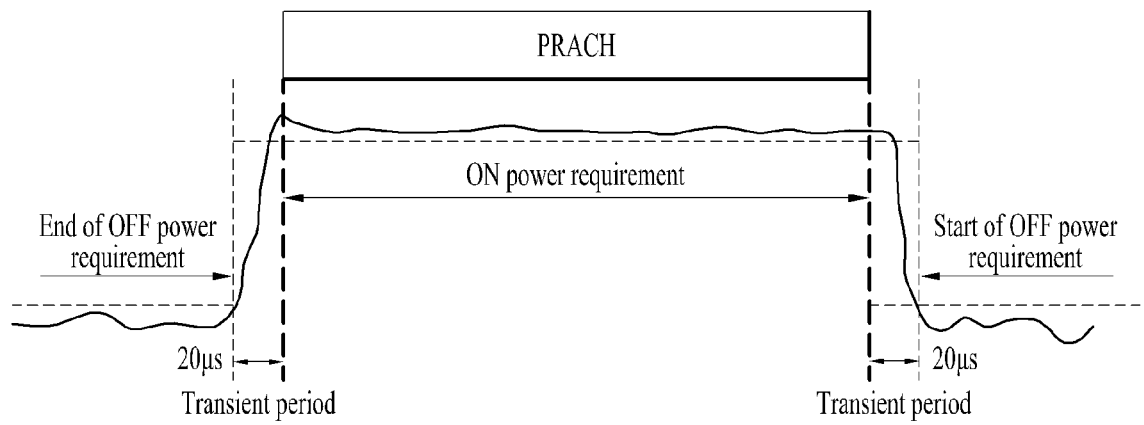
FIG. 8 is a diagram illustrating a PRACH time mask.

FIG. 8 is a diagram illustrating a PRACH time mask.

As shown in FIG. 8, a PRACH ON power is defined as an average power for a PRACH measurement period except a transient period. A length of a measurement period per different PRACH preamble format is as follows.

TABLE 4

| PRACH preamble format | Measurement period (ms) |
|---|---|
| 0 | 0.9031 |
| 1 | 1.4844 |
| 2 | 1.8031 |
| 3 | 2.2844 |
| 4 | 0.1479 |

Figure 9:
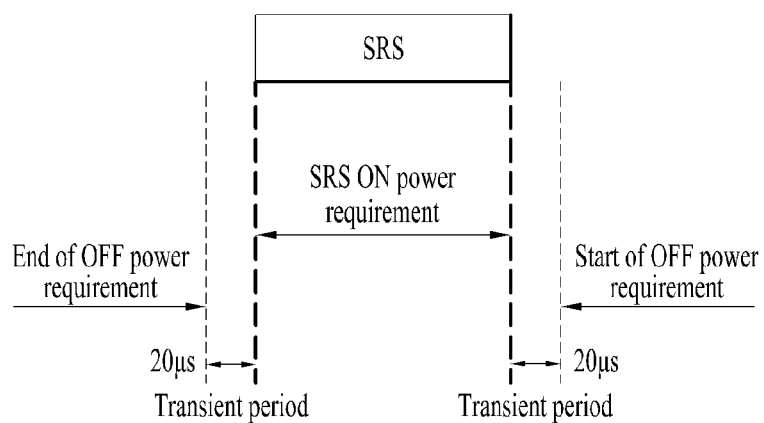
FIG. 9 is a diagram illustrating an SRS time mask for a frame structure type 1 and a frame structure type 2.
Figure 10:
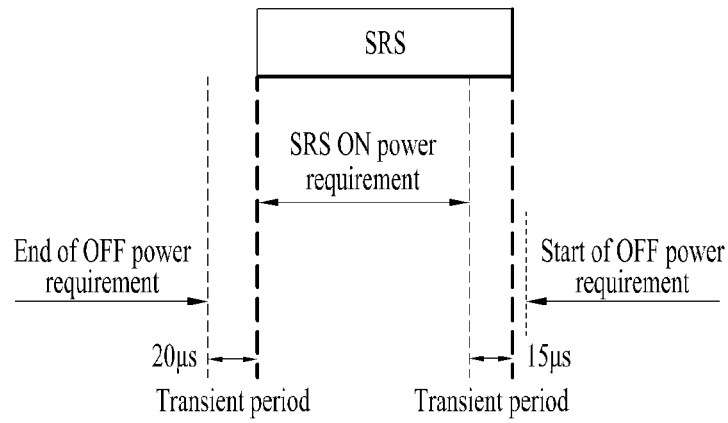
FIG. 10 is a diagram illustrating an SRS time mask for a frame structure type 3.
Figure 11:
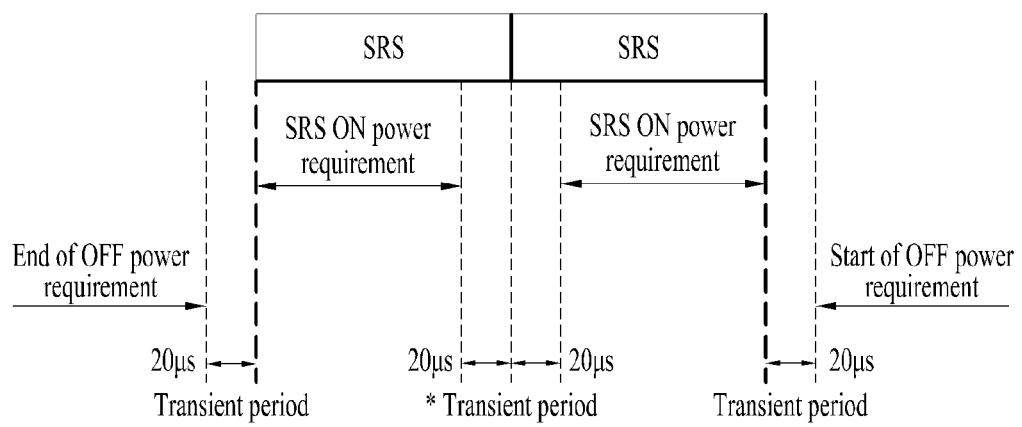
FIG. 11 is a diagram illustrating a duplex SRS time mask in case of UpPTS transmission.

FIG. 9 is a diagram illustrating an SRS time mask for a frame structure type 1 and a frame structure type 2, FIG. 10 is a diagram illustrating an SRS time mask for a frame structure type 3, and FIG. 11 is a diagram illustrating a duplex SRS time mask in case of UpPTS transmission.

As shown in FIGS. 9 and 10, in case of single SRS transmission, ON power is defined as an average power for a symbol period except a transient period.

As shown in FIG. 11, in case of duplex SRS transmission, ON power is defined as an average power for each symbol period except a transient period.

Figure 12:
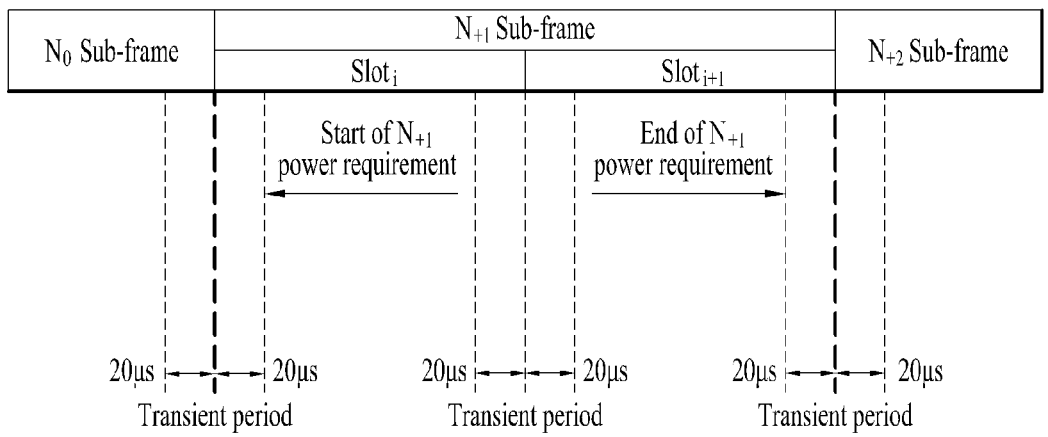
FIGS. 12 and 13 are diagrams illustrating ON/OFF time mask at a slot/subframe boundary.
Figure 13:
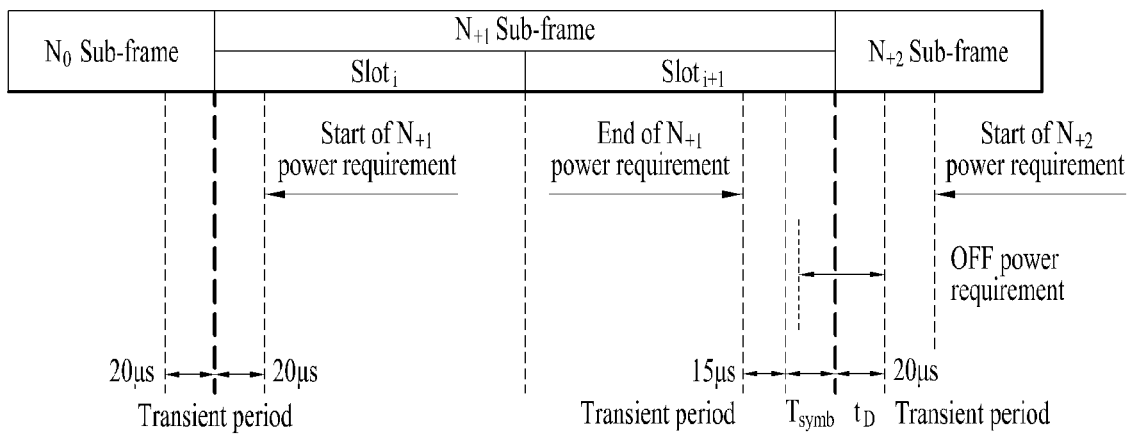

FIGS. 12 and 13 are diagrams illustrating ON/OFF time masks at a slot/subframe boundary.

Referring to FIGS. 12 and 13, a subframe boundary time mask is defined as a period observed between a previous or next subframe and a (reference) subframe.

Particularly, in the example of FIG. 12, transient periods (20 µs+20 µs) of 40 micro seconds (µs) are respectively configured between subframe N0 and subframe N+1 and between subframe N+1 and subframe N+2. In this case, the transient period at a slot boundary within a subframe is configured only in case of intra-subframe frequency hopping, and is configured at both sides of the slot boundary per 20 micro seconds (µs).

As shown in FIG. 13, if a bit indicating a PUSCH end symbol within related DCI has a value of '1' and a PUSCH start position is modified as much as $t_D$ at next subframe, the subframe time mask for the frame structure type 3 is defined. In this case, Tsymb denotes a length of an end SC-FDMA symbol. The OFF power requirements are applied after 5 us from the end of the last symbol which is transmitted.

FIGS. 14 to 19 are diagrams illustrating PUCCH/PUSCH/SRS time masks.

First of all, PUCCH/PUSCH/SRS masks are defined as periods observed among a sounding reference signal (SRS), adjacent PUSCH/PUCCH symbols and next subframe. Hereinafter, the SRS may mean a sounding reference signal, or a sounding reference symbol to which the sounding reference signal is transmitted. Unless mentioned separately, the PUCCH/PUSCH/SRS time masks may be applied for all frame structure types and allowed PUCCH/PUSCH/SRS transmission.

Figure 14:
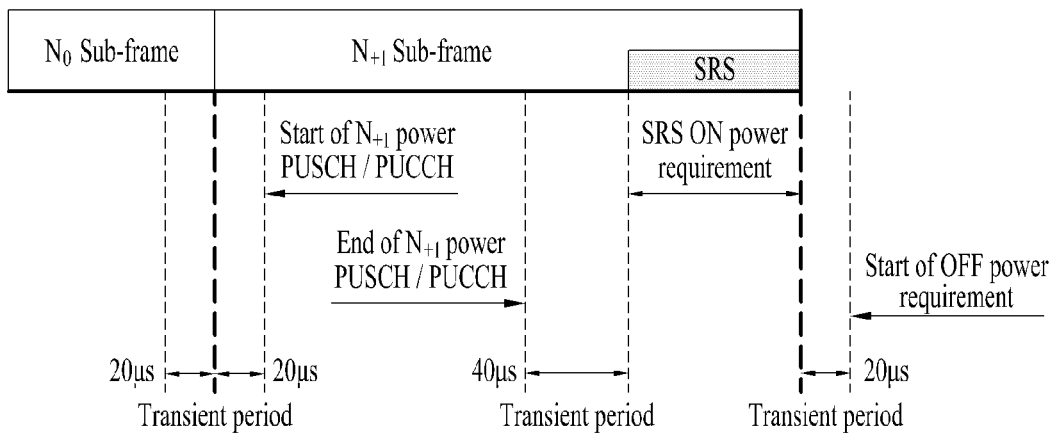
FIGS. 14 to 19 are diagrams illustrating PUCCH/PUSCH/SRS time masks.

In detail, FIG. 14 illustrates an example of PUCCH/PUSCH/SRS time masks for the frame structure type 1 and the frame structure type 2 when there is a transmission before SRS but not after.

Figure 15:
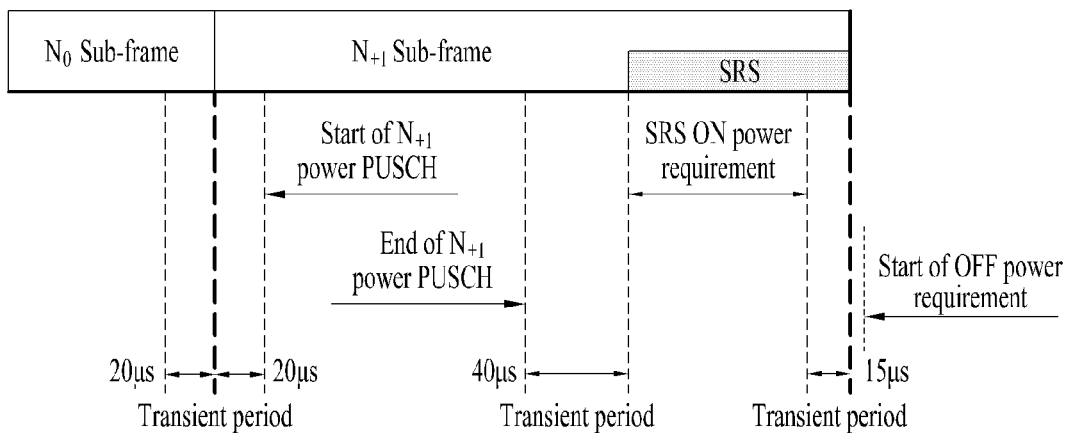

FIG. 15 illustrates an example of PUCCH/PUSCH/SRS time masks for the frame structure type 3 when there is a transmission before SRS but not after. In this case, the OFF power requirements are applied after 5 us from the end of the last symbol which is transmitted.

Figure 16:
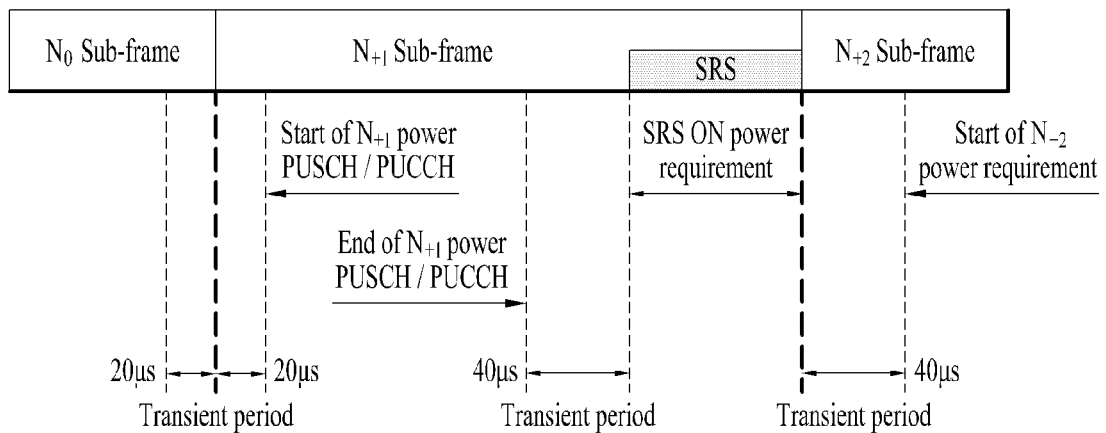

FIG. 16 illustrates an example of PUCCH/PUSCH/SRS time masks when there is a transmission before and after SRS.

Figure 17:
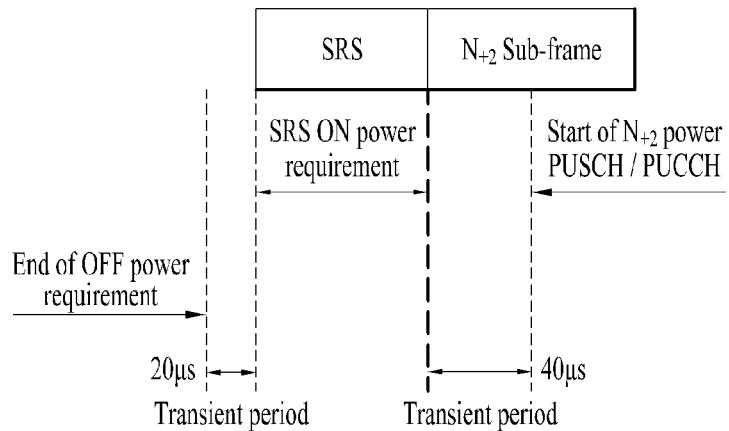

FIG. 17 illustrates an example of PUCCH/PUSCH/SRS time masks when there is a transmission after SRS but not before.

Figure 18:
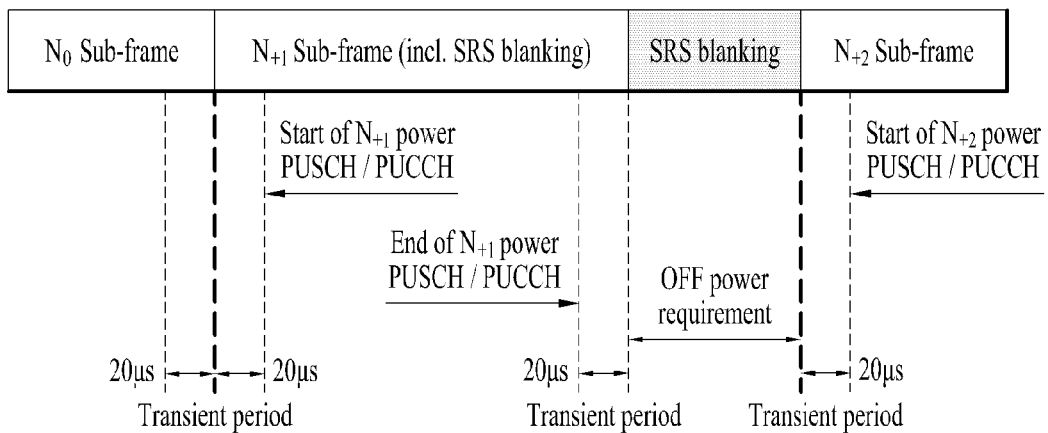

FIG. 18 illustrates an example of an SRS time mask for the frame structure type 1 and the frame structure type 2 when there is FDD SRS blanking.

Figure 19:
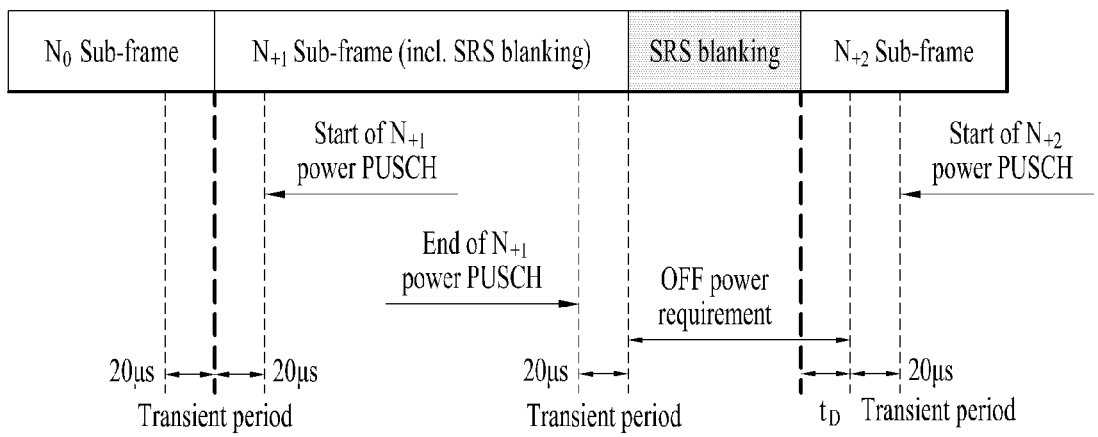

FIG. 19 illustrates an example of an SRS time mask for the frame structure type 3 when there is SRS blanking. In more detail, when there is SRS blanking, transmission after SRS symbol and SRS time mask having a PUSCH start position modified as much as $t_D$ may be expressed as illustrated in FIG. 19.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 5

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,μ} = N_{symb}^{slot} N_{slot}^{subframe,μ}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^μ \in \{0, \ldots, N_{slot}^{subframe,μ}-1\}$ and may also be numbered within a frame in ascending order like $n_{s,f}^μ \in \{0, \ldots, N_{slot}^{frame,μ}-1\}$. In this case, the number of consecutive OFDM symbols in one slot ($N_{symb}^{slot}$) may be determined as shown in the following table according to the cyclic prefix. The start slot ($n_s^μ$) of one subframe is aligned with the start OFDM symbol ($n_s^μ N_{symb}^{slot}$) of the same subframe in the time dimension. Table 6 shows the number of OFDM symbols in each slot/frame/subframe in the case of the normal cyclic prefix, and Table 7 shows the number of OFDM symbols in each slot/frame/subframe in the case of the extended cyclic prefix.

TABLE 6

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 7

| μ | $N_{symb}^{slot}$ | $N_{slot}^{frame,μ}$ | $N_{slot}^{subframe,μ}$ |
|---|---|---|---|
| 2 | 12 | 40 | 4 |

In the NR system to which the present invention can be applied, a self-contained slot structure can be applied based on the above-described slot structure.

Figure 20:
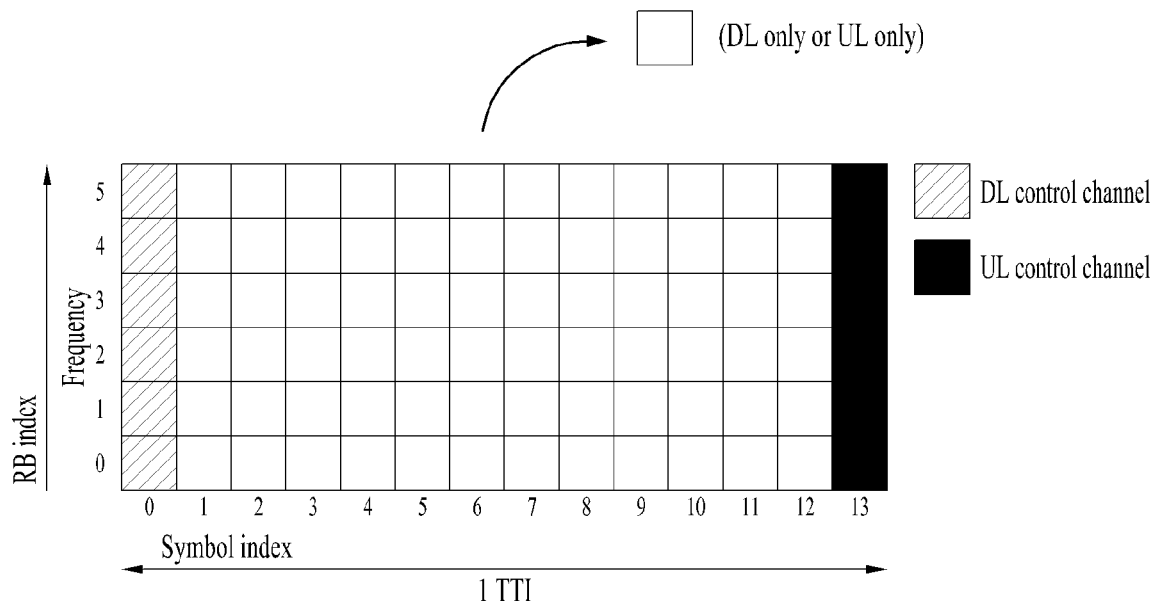
FIG. 20 is a diagram illustrating a self-contained subframe structure applicable to the present invention.

FIG. 20 is a diagram illustrating a self-contained slot structure applicable to the present invention.

In FIG. 20, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30

GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 21:
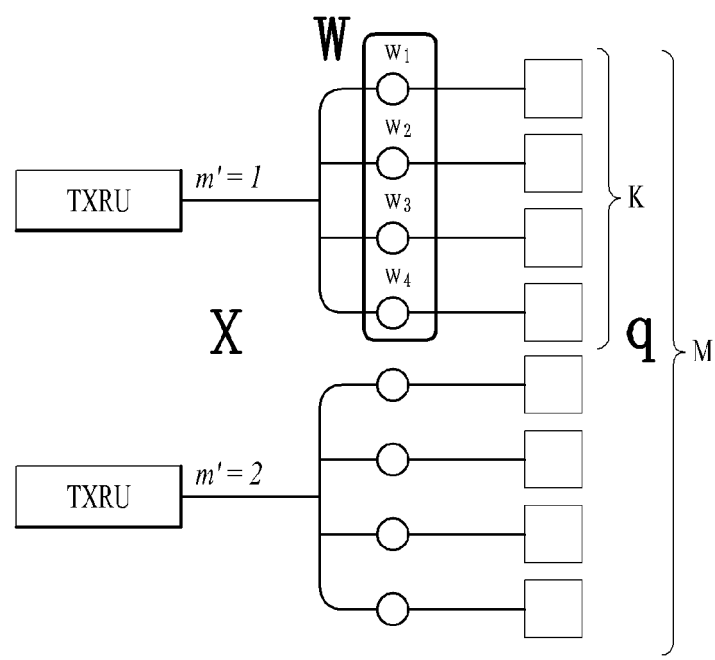
FIGS. 21 and 22 are diagrams illustrating representative connection methods for connecting TXRUs to antenna elements.
Figure 22:
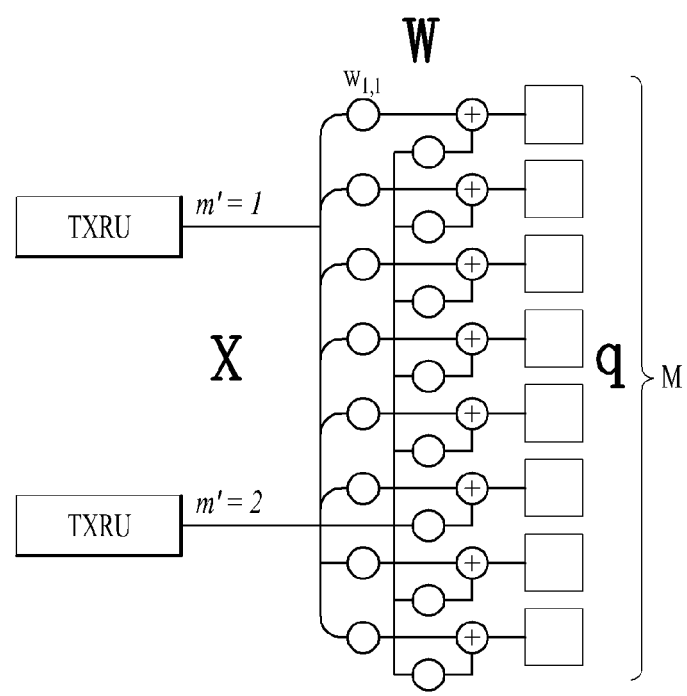

FIGS. 21 and 22 are diagrams illustrating representative methods for connecting TXRUs to antenna elements. Here, the TXRU virtualization model represents the relationship between TXRU output signals and antenna element output signals.

FIG. 21 shows a method for connecting TXRUs to sub-arrays. In FIG. 21, one antenna element is connected to one TXRU.

Meanwhile, FIG. 22 shows a method for connecting all TXRUs to all antenna elements. In FIG. 22, all antenna element are connected to all TXRUs. In this case, separate addition units are required to connect all antenna elements to all TXRUs as shown in FIG. 22.

In FIGS. 21 and 22, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 21 has a disadvantage in that it is difficult to achieve beamforming focusing but has an advantage in that all antennas can be configured at low cost.

On the contrary, the configuration shown in FIG. 22 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 23:
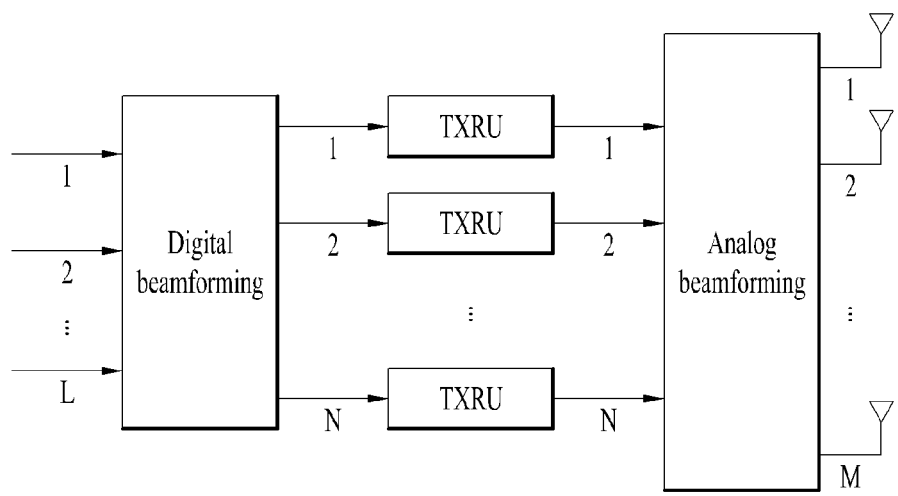
FIG. 23 is a schematic diagram illustrating a hybrid beamforming structure according to an embodiment of the present invention from the perspective of TXRUs and physical antennas.

FIG. 23 is a schematic diagram illustrating a hybrid beamforming structure according to an embodiment of the present invention from the perspective of TXRUs and physical antennas. In FIG. 23, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 24:
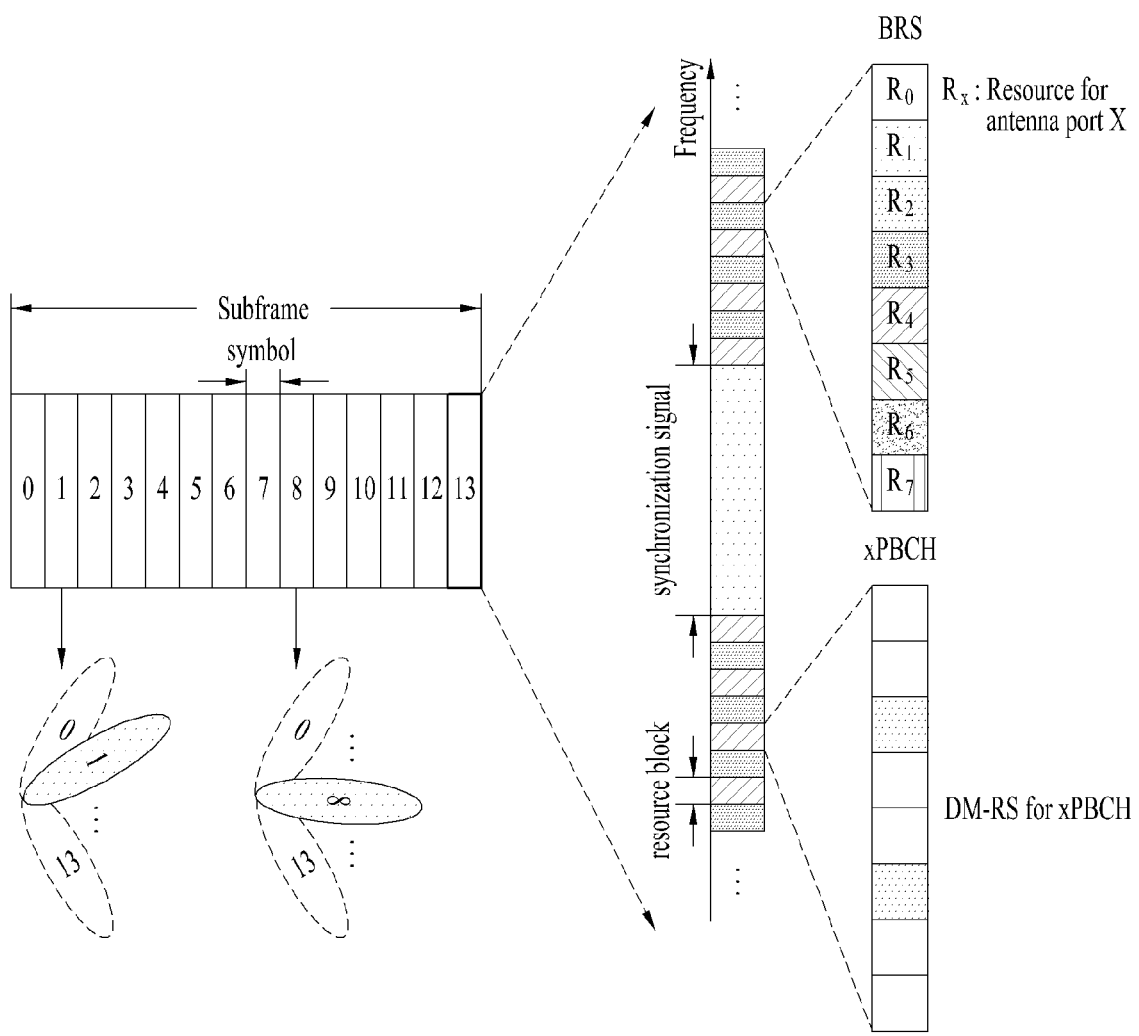
FIG. 24 is a diagram schematically illustrating the beam sweeping operation for synchronization signals and system information during a downlink (DL) transmission process according to an embodiment of the present invention.

FIG. 24 is a diagram schematically illustrating the beam sweeping operation for synchronization signals and system information during a downlink (DL) transmission process according to an embodiment of the present invention In FIG. 24, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as illustrated in FIG. 24, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

2.4. Bandwidth Part (BWP)

In an NR system to which the present invention is applicable, a bandwidth of a maximum 400 MHz may be supported per component carrier (CC).

If a specific UE operates in this wideband CC and always operates in a state that RF module for all CCs is powered on, UE battery consumption of the specific UE may be increased.

Otherwise, in the NR system to which the present invention is applicable, if various use cases (e.g., eMBB (enhanced Mobile BroadBand), URLLC (Ultra Reliability Low Latency Communication), mMTC (massive Machine Type Communication), etc.) can be supported within one wideband CC, the NR system may support different numerologies (e.g., sub-carrier spacing) per frequency band within the corresponding CC.

Otherwise, UEs operating in the NR system to which the present invention may have different capabilities for a maximum bandwidth per UE.

Considering the various cases as above, a BS of the NR system may indicate, to a UE, an operation within a partial bandwidth not a full bandwidth of the wideband CC. At this time, for convenience of description, the partial bandwidth will be referred to as a bandwidth part (BWP). In this case, the BWP may include continuous resource blocks (RBs) on a frequency axis and correspond to one numerology (e.g., sub-carrier spacing, CP (Cyclic Prefix) length, slot/mini-slot duration, etc.).

Meanwhile, the BS may configure a plurality of BWPs within one CC configured for the UE.

For example, the BS may configure a first BWP that reserves a relatively small frequency domain for a PDCCH monitoring slot. At this time, PDSCH indicated by PDCCH may be scheduled on a second BWP greater than the first BWP.

Otherwise, if a plurality of UEs are condensed on a specific BWP, the BS may configure a different BWP for some UEs for load balancing.

Otherwise, considering frequency domain inter-cell interference cancellation, the BS may configure both BWPs except some spectrums in the middle of a full bandwidth within the same slot.

Therefore, the BS may configure at least one DL/UL BWP for a UE associated with the wideband CC, and may activate at least one of DL/UL BWPs configured at a specific time (through first layer signaling (L1 signaling) or MAC (Medium Access Control) CE (Control Element) or RRC (Radio Resource Control) signaling, etc.). At this time, the activated DL/UL BWP may be defined as an active DL/UL BWP.

Also, if the UE is in an initial access process, or before RRC connection is configured, the UE may fail to receive a configuration for a DL/UL BWP from the BS. In this case, the UE may assume a default DL/UL BWP. At this time, the DL/UL BWP assumed by the UE in the above status may be defined as an initial active DL/UL BWP.

2.5. DCI Format in NR System

The NR system to which the present invention is applicable may support the following DCI formats. First of all, the NR system may support DCI format 0_0 and DCI format 0_1 as DCI formats for PUSCH scheduling, and may support DCI format 1_0 and DCI format 1_1 as DCI formats for PDSCH scheduling. Also, as DCI formats available for the other purposes, the NR system may additionally support DCI format 2_0, DCI format 2_1, DCI format 2_2, and DCI format 2_3.

In this case, the DCI format 0_0 may be used for scheduling of TB (Transmission Block) based (or TB-level) PUSCH, and the DCI format 0_1 may be used for scheduling of TB (Transmission Block) based (or TB-level) PUSCH or (if CBG (Code Block Group) based signal transmission and reception is configured) CBG based (or CBG-level) PUSCH.

Also, the DCI format 1_0 may be used for scheduling of TB based (or TB-level) PDSCH, and the DCI format 1_1 may be used for scheduling of TB based (or TB-level) PDSCH or (if CBG based signal transmission and reception is configured) CBG based (or CBG-level) PDSCH.

Also, the DCI format 2_0 may be used for notifying the slot format, the DCI format 2_1 may be used for notifying the PRB(s) and OFDM symbol(s) where UE may assume no transmission intended for the UE, the DCI format 2_2 may be used for transmission of a TPC (Transmission Power Control) command of PUCCH and PUSCH, and the DCI format 2_3 may be used for the transmission of a group of TPC commands for SRS transmissions by one or more UEs.

Detailed features of the DCI formats may be supported by 3GPP TS 38.212 document. That is, apparent steps or portions, which are not described, among DCI format related features may be described with reference to the above document. All terminologies disclosed herein may be described by the above standard document.

3. Proposed Embodiment

Hereinafter, the configuration proposed in the present invention will be described based on the technical spirits in more detail.

In the NR system to which the present invention is applicable, an uplink control indicator (UCI) which includes HARQ-ACK and/or CSI (channel state information) and/or scheduling request and/or beam related information may be transmitted through a physical uplink control channel (PUCCH). At this time, in the NR system to which the present invention is applicable, as a PUCCH for transmitting the UCI, a PUCCH (hereinafter, referred to as sPUCCH for convenience of description) which includes 1 symbol or 2 symbols and has a relatively short length and a PUCCH (hereinafter, referred to as long PUCCH for convenience of description) which includes 4 symbols or more and has a relatively long length may be supported within one slot comprised of 14 (7) Orthogonal Frequency Division Multiplexing (OFDM).

Also, in the NR system to which the present invention is applicable, as a physical uplink shared channel (PUSCH) to which UL data are transmitted, sPUSCH which includes relatively small symbols (e.g., 2 symbols or less) and a long PUSCH which includes relatively many symbols (e.g., 4 symbols or more) may be supported within one slot.

Also, a sounding reference signal (SRS) used for UL channel estimation may be transmitted within a corresponding slot at which the PUSCH transmitted.

Hereinafter, a method for configuring ON/OFF time masks in transmitting an uplink signal such as PUCCH/PUSCH/SRS in the NR system will be described in detail. In more detail, in the present invention, ON/OFF time masks when each uplink signal is transmitted will be described, and ON/OFF time masks applicable to various cases such as a case that (frequency) hopping within a slot is configured (a case that (frequency) hopping exists within a slot) and a case that time domain multiplexing (TDM)/frequency domain multiplexing (FDM) are performed between uplink signals will be described in detail.

As described above, the ON/OFF time mask are defined as a period observed when an output power from OFF power to ON power is turned on and a period observed when an output power from ON power to OFF power is turned off. In this way, if the output power is turned on or turned off, a transient period of a certain time exists, and an OFF power measurement period is defined in a specific period except the transient period. Also, an ON power measurement period is defined as an average power for a period except the transient period.

In other words, RF requirement of the UE for OFF power or ON power is sufficiently satisfied by excluding a corresponding transient period, and additional RF requirement for OFF power or ON power does not exist for the corresponding transient period.

Therefore, the ON/OFF time masks according to the present invention may define ON/OFF power measurement periods of the UE and periods where RF requirement for the ON/OFF power measurement period should be satisfied.

3.1 General ON/OFF Time Mask of Single Channel/Signal

According to the legacy LTE system, a general ON/OFF time mask for an uplink channel/signal may be classified into two types.

Figure 25:
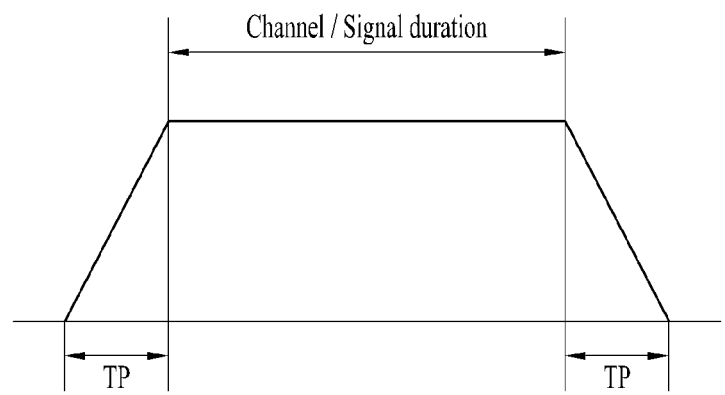
FIGS. 25 and 26 are diagrams illustrating general ON/OFF time masks applicable to the present invention.
Figure 26:
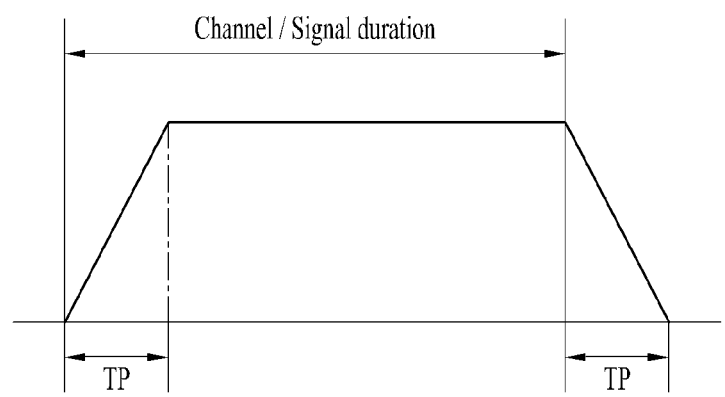

FIGS. 25 and 26 are diagrams illustrating general ON/OFF time masks applicable to the present invention;

As shown in FIG. 25, the general ON/OFF time mask applicable to the present invention may be configured to protect a transmission duration of an uplink channel/signal and position a transient period (TP) at the front and rear of the transmission duration. Hereinafter, the ON/OFF time mask will be referred to as first option ON/OFF time mask. In other words, the ON/OFF time mask may be configured so as not to include a TP within a transmission period of a specific uplink channel/signal.

Alternatively, as shown in FIG. 26, the general ON/OFF time mask may be configured to include a TP at the first part of the transmission duration of the uplink channel/signal and not to include the TP at the last part of the transmission duration. Hereinafter, the ON/OFF time mask will be referred to as second option ON/OFF time mask. In other words, the ON/OFF time mask may be configured to include a TP within a transmission period of a specific uplink channel/signal.

In the NR system according to the present invention, in the general ON/OFF time mask, SRS and sPUCCH may be configured to follow the first option ON/OFF time mask, and long PUCCH/PUSCH may be configured to follow the second option ON/OFF time mask.

Alternatively, long PUCCH and/or PUSCH may be determined to follow the first option ON/OFF time mask or the second option ON/OFF time mask depending on the number of symbols constituting long PUCCH and/or PUSCH (or time axis duration, e.g.: X us) or whether a demodulation reference signal (DMRS) is transmitted from the front symbol. For example, if the number of symbols constituting long PUCCH and/or PUSCH is Y (e.g., Y=7) or less, since the long PUCCH and/or PUSCH may be affected by the transient period, the long PUCCH and/or PUSCH may be configured to follow the first option ON/OFF time mask. If the number of symbols constituting long PUCCH and/or PUSCH exceeds Y symbols, the long PUCCH and/or PUSCH may be configured to follow the second option ON/OFF time mask. For another example, if the first symbol of the long PUCCH and/or PUSCH is a DMRS symbol, the long PUCCH and/or PUSCH may be configured to follow the first ON/OFF time mask, whereby the corresponding symbol may be protected.

3.2. ON/OFF Time Mask During Hopping within Slot

Figure 27:
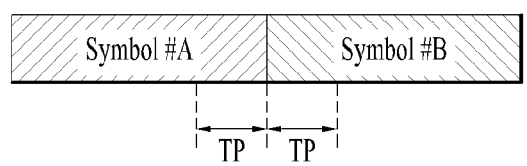
FIGS. 27 and 28 are diagrams illustrating ON/OFF time masks for two symbols at a hopping boundary.
Figure 28:
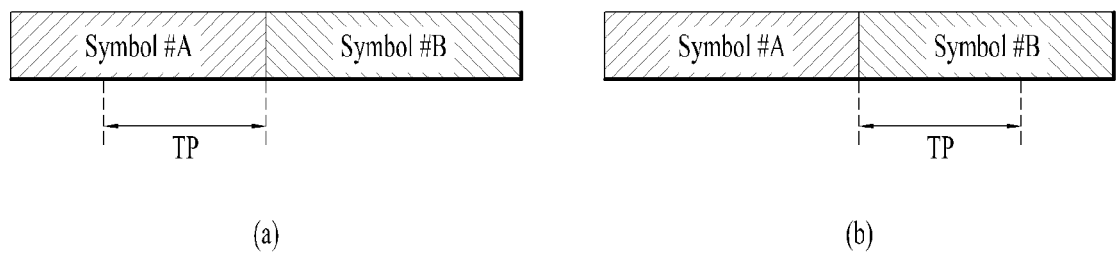

FIGS. 27 and 28 are diagrams illustrating ON/OFF time masks for two symbols at a hopping boundary.

First of all, if frequency hopping is performed for two slots constituting one subframe in the legacy LTE system, as shown in FIG. 27, a TP may be included in both of two symbols at a hopping boundary.

However, as described above, since the NR system to which the present invention is applicable supports various uplink signals/channels as compared with the LTE system, various ON/OFF time masks may be applied as follows.

For example, in the NR system to which the present invention is applicable, intra-slot hopping may be allowed for a long PUCCH and/or PUSCH. At this time, as shown in FIG. 27, the TP may be included in both of the two symbols at the hopping boundary.

For another example, one of the two symbols at the hopping boundary may be a data symbol and the other one may be a Demodulation Reference Signal (DMRS), wherein one of the two symbols may have a high priority. At this time, the ON/OFF time mask of FIG. 28 may be applied to the two symbols at the hopping boundary. In more detail, if one of the two symbols has a high priority, the TP may be configured to be included in one of the two symbols at the hopping boundary.

In this case, the TP of FIG. 28 may generally be greater than that of FIG. 27.

Hereinafter, for convenience of description, one of the two symbols at the hopping boundary, in which the TP is included, will be referred to as VicSym (victim symbol, e.g.: symbol #A of FIG. 28(a) or symbol #B of FIG. 28(b)), and the other one of the two symbols at the boundary hopping boundary, in which the TP is not included, will be referred to as PrtSym (protected symbol, symbol #B of FIG. 28(a) or symbol #A of FIG. 28(b)).

In summary, in the long PUCCH and/or PUSCH for which intra-slot hopping is performed, if one at the hopping boundary is a DMRS symbol and the other one is a data symbol, the DMRS symbol may be set to PrtSym (or VicSym), and the data symbol may be set to VicSym (or PrtSym).

Additionally, a corresponding ON/OFF time mask applied to the two embodiments described as above may be varied depending on the number of symbols (or time axis duration, e.g.: X us) constituting the long PUCCH and/or PUSCH, or a PUCCH format.

For example, if the number of symbols constituting the long PUCCH or PUSCH is Z (e.g.: Z=7) or less, the ON/OFF time mask of FIG. 28 may be applied, and if the number of symbols constituting the long PUCCH or PUSCH exceeds Z, the ON/OFF time mask of FIG. 27 may be applied.

For another example, since it is important to maintain orthogonality of RS with respect to a PUCCH format to which a time domain orthogonal cover code (OCC) is applied, the ON/OFF time mask of FIG. 28 may be applied to the PUCCH format. On the other hand, the ON/OFF time mask of FIG. 27 may be applied to a PUCCH format to which the time domain OCC is not applied.

3.3. ON/OFF Time Mask During TDM Between Channels/Signals

In this section, ON/OFF time mask in case of TDM between different uplink channels/signals will be described in detail. In this case, TDM may mean that different uplink channels/signals are transmitted from continuous symbols.

3.3.1. (sPUCCH+Long PUCCH) or (sPUCCH+PUSCH)

sPUCCH and long PUCCH (or PUSCH) may have a preceding/following relation within the same slot/mini-slot, or may be positioned at different slots/mini-slots. For example, 1-symbol sPUCCH may be positioned at the last symbol of slot#n, and the long PUCCH (or PUSCH) may be positioned from the first symbol of slot#n+1. For another example, the long PUCCH (/PUSCH) may be positioned at the last symbol of slot#n, and the sPUCCH may be positioned from the first symbol of slot#n+1.

In the above case, one of the two symbols positioned at a boundary of the sPUCCH and the long PUCCH/PUSCH, which belongs to the sPUCCH, may be set to PrtSym, and the other one, which belongs to the long PUCCH/PUSCH, may be set to VicSym. Alternatively, if one of the two symbols positioned at the boundary of the sPUCCH and the long PUCCH/PUSCH, which belongs to the long PUCCH/PUSCH, is a DMRS symbol, a TP may be included in both of the two symbols as shown in FIG. 27. Alternatively, UCI information, which will be carried in the sPUCCH, (only if the sPUCCH and the long PUCCH/PUSCH are positioned at the same slot) may be transmitted through the long PUCCH/PUSCH, and the sPUCCH may be configured to be dropped.

3.3.2. SRS+sPUCCH

Basically, one of two symbols positioned at a boundary between SRS and sPUCCH, which belongs to the sPUCCH, may be set to PrtSym, and the other one, which belongs to the SRS, may be set to VicSym. Alternatively, the symbol which belongs to the sPUCCH may be set to VicSym, and the symbol which belongs to the SRS may be set to PrtSym. However, this configuration may be applied only if the SRS is for beam refinement or beam refinement not channel estimation.

For another example, the UE may remove a transient period by equally coordinating powers of the sPUCCH and the SRS. To this end, a power value of the SRS may be set to correspond to that of the sPUCCH.

At this time, if the SRS (for beam refinement or beam management) is transmitted continuously from various symbols, the power value coordinated to correspond to the power value of the sPUCCH may commonly be applied to the SRS on the various symbols.

Alternatively, if the SRS (for beam refinement or beam management) is transmitted continuously from various symbols, the UE may set the value of the sPUCCH equally to that of the SRS by coordinating the power value of the sPUCCH without coordinating the value of the SRS.

3.3.3. (SRS+Long PUCCH) or (SRS+PUSCH)

SRS and long PUCCH (or PUSCH) may have a preceding/following relation within the same slot/mini-slot, or may be positioned at different slots/mini-slots. For example, the SRS may be positioned at the last symbol of slot#n, and the long PUCCH (or PUSCH) may be positioned from the first symbol of slot#n+1. For another example, the long PUCCH (/PUSCH) may be positioned to reach the last symbol of slot#n, and the SRS may be positioned from the first symbol of slot#n+1.

In this case, according to one embodiment applicable to the present invention, one of two symbols positioned at a boundary of the SRS and the long PUCCH/PUSCH, which belongs to the SRS, may be set to PrtSym, and the other one, which belongs to the long PUCCH/PUSCH, may be set to VicSym.

Alternatively, according to another embodiment applicable to the present invention, one of two symbols positioned at the boundary of the SRS and the long PUCCH/PUSCH, which belongs to the SRS, may be set to VicSym, and the other one, which belongs to the long PUCCH/PUSCH, may be set to PrtSym. Alternatively, if the SRS is transmitted from only some symbols, since channel/beam estimation may not be performed, the UE may drop the SRS and set the symbol, which belongs to the long PUCCH/PUSCH, to PrtSym.

A corresponding method applied to the two embodiments described as above may be varied depending on the number of symbols (or time axis duration, e.g.: X us) constituting the long PUCCH and/or PUSCH, or a PUCCH format.

For example, if the number of symbols constituting the long PUCCH or PUSCH is W (e.g.: W=7) or less, the symbol which belongs to the SRS may be set to VicSym and the symbol which belongs to the long PUCCH/PUSCH may be set to PrtSym (or TP is included in each of the SRS and the long PUCCH/PUSCH). If the number of symbols constituting the long PUCCH or PUSCH exceeds W, the symbol which belongs to the SRS may be set to PrtSym, and the symbol which belongs to the long PUCCH/PUSCH may be set to VicSym.

For another example, since it is important to maintain orthogonality of RS with respect to a PUCCH format to which a time domain orthogonal cover code (OCC) is applied, the symbol which belongs to the SRS may be set to VicSym and the symbol which belongs to the long PUCCH/PUSCH may be set to PrtSym. On the other hand, with respect to a PUCCH format to which the time domain OCC is not applied, the symbol which belongs to the SRS may be set to PrtSym, and the symbol which belongs to the long PUCCH/PUSCH may be set to VicSym.

The method suggested in this section may be applied differently per slot. For example, in two symbols positioned at a boundary between channel/signal A and channel/signal B, the symbol which belongs to the channel/signal A may be set to PrtSym at a specific slot, and the symbol which belongs to the channel/signal A may be set to VicSym at another slot.

3.4. ON/OFF Time Mask During FDM Between Channels/Signals

In this section, ON/OFF time mask in case of FDM between different uplink channels/signals will be described in detail. In this case, FDM may mean that different uplink channels/signals are transmitted from the same carrier and the same slot.

Particularly, in this section, when the long PUCCH and the PUSCH are subjected to FDM, ON/OFF time mask applicable to a case that a duration in a time domain of the long PUCCH and PUSCH is different will be described in detail.

Figure 29:
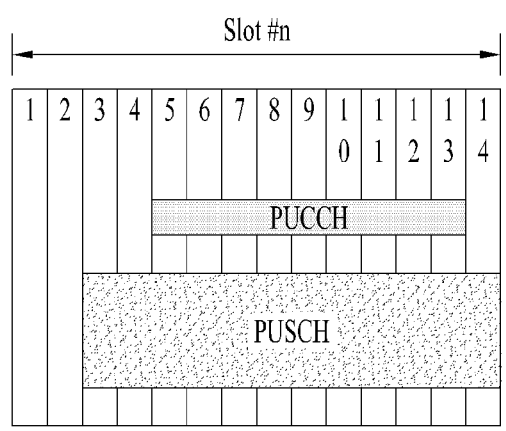
FIG. 29 is a diagram illustrating that long PUCCH and PUSCH are transmitted by FDM within one slot in accordance with the present invention.

FIG. 29 is a diagram illustrating that long PUCCH and PUSCH are transmitted by FDM within one slot in accordance with the present invention.

As shown in FIG. 29, the PUSCH and the long PUCCH may be transmitted by FDM within one slot comprised of 14 symbols. At this time, PUSCH transmission may start prior to long PUCCH transmission, or may end after long PUCCH transmission. On the contrary, long PUCCH transmission may start prior to PUSCH transmission, or long PUCCH transmission may end after PUSCH transmission.

In this case, the applicable ON/OFF time mask may be configured as follows.

3.4.1. First Example

Considering a starting position, a method for setting only symbol #4 to VicSym (hereinafter, Alt 1) or a method for configuring a TP by respectively using symbol #4 and symbol #5 (hereinafter, Alt 2) may be applied to the embodiment of FIG. 29.

In comparison between the two methods, the PUSCH may only be affected by the TP in case of Alt 1 but both the PUSCH and the long PUCCH may be affected by the TP in case of Alt 2.

Therefore, to minimize that the PUSCH and the long PUCCH are affected by the TP, it may be preferable to configure the TP in only a preceding channel like Alt 1. In other words, in two channels subjected to FDM, which are overlapped from symbol #k, the TP may be configured in only symbol#k−1 of the channel that first starts.

3.4.2. Second Example

Considering an ending position, a method for setting only symbol #14 to VicSym (hereinafter, Alt A) or a method for configuring a TP by respectively using symbol #13 and symbol #14 (hereinafter, Alt B) may be applied to the embodiment of FIG. 29.

In comparison between the two methods, the PUSCH may only be affected by the TP in case of Alt A but both the PUSCH and the long PUCCH may be affected by the TP in case of Alt B.

Therefore, to minimize that the PUSCH and the long PUCCH are affected by the TP, it may be preferable to configure the TP in only a preceding channel like Alt A. In other words, if two channels subjected to FDM are overlapped to reach symbol #k, the TP may be configured in only symbol#k+1 of the channel that later ends.

3.4.3. Third Example

Alternatively, if a symbol of a specific channel is affected by the TP, UCI piggyback may be applied. Therefore, the UE may remove an influence affected by the TP.

The first embodiment or the second embodiment described as above may generally be applied to the case of FDM between uplink channels/signals of different durations as well as the case that the long PUCCH and the PUSCH are subjected to FDM. For example, the first embodiment of the second embodiment may equally be applied to the case of FDM between the sPUCCH (or SRS) and the long PUCCH (or PUSCH) and the case of FDM between the sPUCCH and the SRS.

3.5. ON/OFF Time Mask of Blanking Case

In this section, ON/OFF time mask applicable to the case that transmission is performed in a state that some symbols of a slot are empty will be described in detail.

If transmission of an uplink channel/signal is configured to end prior to a slot boundary (or configured mini-slot boundary), the TP may be configured to be included in the last symbol of the corresponding channel/signal. This is because that an important channel/signal to be protected, such as SRS and/or sPUCCH, may be transmitted for a slot area remaining after transmission of the corresponding channel/signal.

On the contrary, if transmission of an uplink channel/signal is configured to start after the slot boundary (or configured mini-slot boundary), the TP may be configured not to be included in the first symbol of the corresponding channel/signal. (That is, the TP may be configured prior to the first symbol.) This is because that another channel/signal to be protected may not be transmitted by being used as a DL-to-UL switching gap prior to a starting point of the corresponding channel/signal.

Alternatively, if transmission of a specific uplink channel/signal is configured prior to a transmission starting point of an uplink channel/signal indicated after the slot boundary (e.g., cell-specific SRS), the TP may be configured to be included in the first symbol of the uplink channel/signal to be transmitted.

Figure 30:
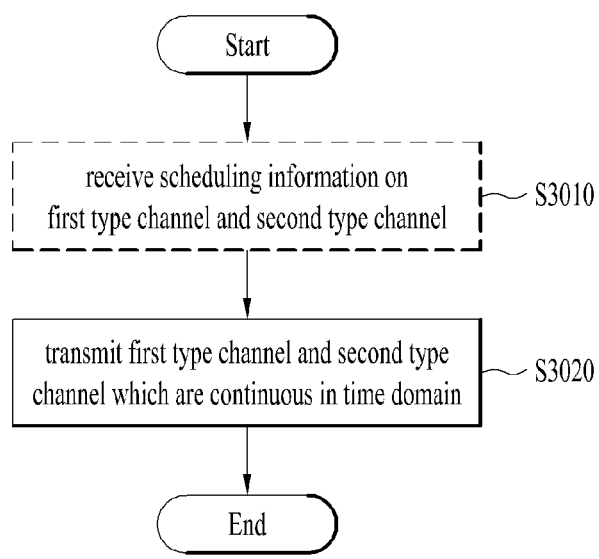
FIG. 30 is a flow chart illustrating uplink signal transmission of a UE, which is applicable to the present invention.

FIG. 30 is a flow chart illustrating uplink signal transmission of a UE, which is applicable to the present invention.

The UE according to the present invention may transmit a first type channel (configured with (or comprised of) 1 or 2 symbols) and a second type channel (configured with 4 or more symbols), which are consecutive (or continuous) in a time domain.

To this end, the UE may receive scheduling information on the first type channel and the second type channel from the BS (S3010). Otherwise, the UE may receive activation information on the first type channel and the second type channel from the BS. Otherwise, the UE may receive scheduling information on one of the first type channel and the second type channel and activation information on the other channel from the BS as a combination of the aforementioned configurations.

As an embodiment applicable to the present invention, all configurations for configuring the first type channel (configured with 1 or 2 symbols) and the second type channel (configured with 4 or more symbols) which are continuous in the time domain may be applied to the UE.

Subsequently, the UE transmits the first type channel and the second type channel which are continuous in the time domain (S3020). To this end, the UE transmits the first type channel and the second type channel by configuring a transient period between the first type channel transmission and the second type channel transmission within a time period corresponding to the second type channel.

In the present invention, the first type channel may be prior to or follow the second type channel in the time domain.

For example, if the first type channel is prior to the second type channel in the time domain, the UE may transmit the first type channel by configuring (or setting) an ending point of a transmission ON power of the first type channel to a boundary between the first type channel and the second type channel.

For another example, if the first type channel follows the second type channel in the time domain, the UE may transmit the first type channel by configuring a starting point of the transmission ON power of the first type channel to the boundary between the first type channel and the second type channel.

Also, in the present invention, the transient period between the first type channel transmission and the second type channel transmission may be configured within one symbol, which is positioned at the boundary between the first type channel and the second type channel and corresponds to the second type channel.

Also, if the first type channel is prior to the second type channel in the time domain and the UE transmits a sounding reference signal (SRS) subsequently to the second type channel, the UE may transmit the second type channel and the SRS by configuring additional transient period between the second type channel transmission and the SRS transmission within additional time period corresponding to the second type channel.

In the above configurations, a Physical Uplink Control Channel (PUCCH) configured with 1 or 2 symbols may be used as the first type channel.

In the above configurations, a Physical Uplink Control Channel (PUCCH) or a Physical Uplink Shared Channel (PUSCH) configured with 4 or more symbols may be used as the second type channel.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the BS to the UE through a predefined signal (e.g., physical layer signal, higher layer signal, etc.).

4. Device Configuration

Figure 31:
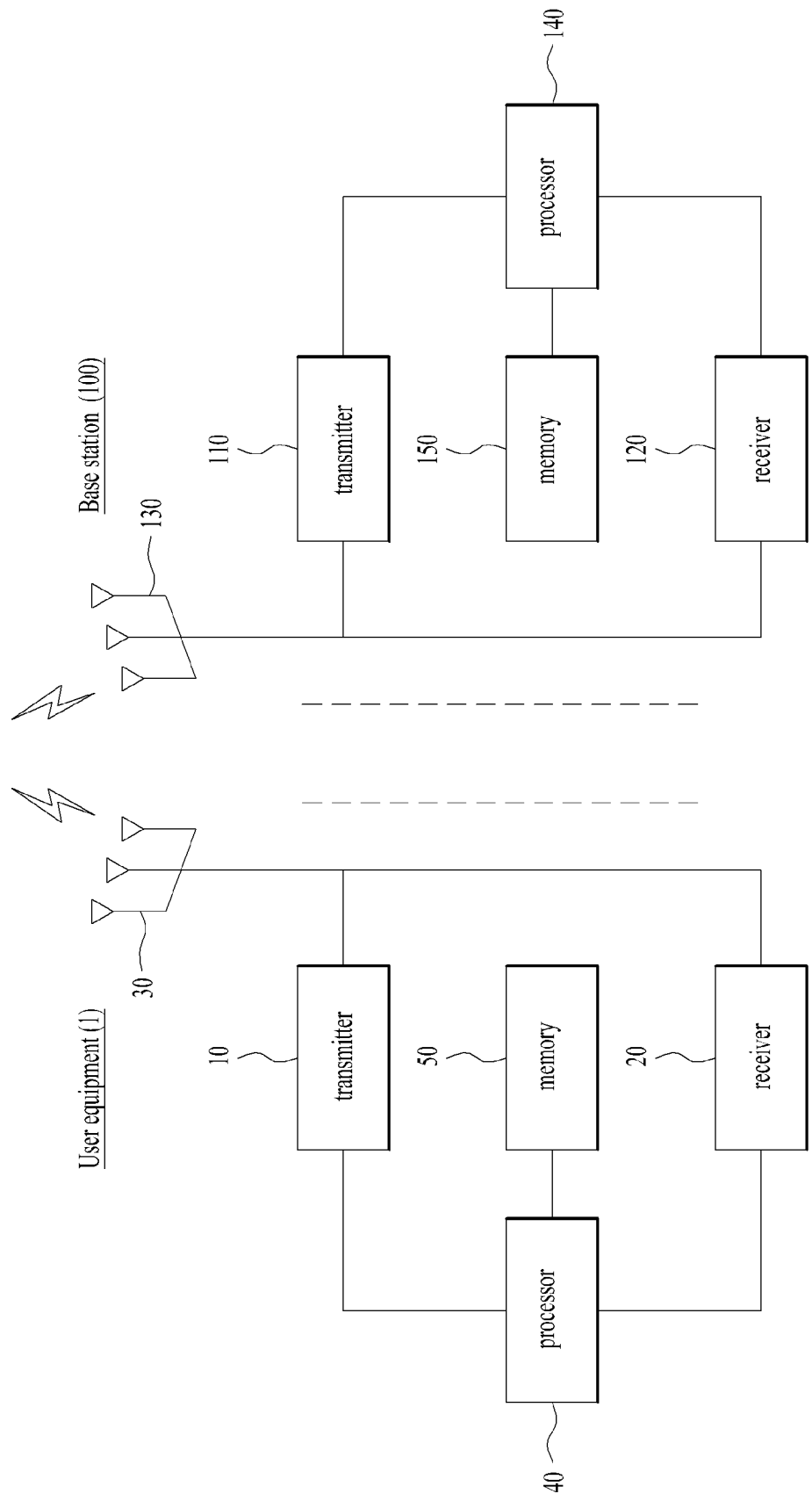
FIG. 31 is a diagram illustrating a configuration of a UE and a BS, through which the embodiments proposed in the present invention can be implemented.

FIG. 31 is a diagram illustrating configurations of a UE and a base station (BS) capable of being implemented by the embodiments proposed in the present invention. The UE and the BS shown in FIG. 31 are operated to implement the aforementioned embodiments of the method for transmitting or receiving an uplink signal between the UE and the BS.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE and the BS configured as above may be operated as follows.

In the present invention, it is assumed that a first type channel configured with 1 or 2 symbols and a second type channel configured with 4 or more symbols are continuous in a time domain. At this time, scheduling of the first type channel and the second type channel may be configured by the BS.

In this case, the UE 1 transmits the first type channel and the second type channel through the transmitter 10 by configuring a transient period between the first type channel transmission and the second type channel transmission within a time period corresponding to the second type channel.

The transmitter and receiver included in the UE and the BS may perform a packet modulation/demodulation function for data transmission, a high-speed packet channel coding function, orthogonal frequency division multiple access (OFDMA) packet scheduling, time division duplex (TDD) packet scheduling, and/or channel multiplexing. Each of the UE and the BS of FIG. 31 may further include a low-power Radio Frequency (RF)/Intermediate Frequency (IF) unit.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting an uplink signal by a user equipment (UE) to a base station (BS) in a wireless communication system, the method comprising:

configuring a long physical uplink control channel (PUCCH) of 4 or more symbols with first uplink control information (UCI);

configuring a short PUCCH of 1 or 2 symbols with second UCI; and transmitting the long PUCCH and the short PUCCH, wherein the transmissions of the long PUCCH and the short PUCCH are consecutive and the long PUCCH is followed by the short PUCCH in a time domain, wherein a first transient period for starting the transmission of the short PUCCH is configured only in the long PUCCH, and wherein a second transient period for ending the transmission of the short PUCCH is configured outside of the short PUCCH.

2. The method of claim 1, wherein a starting point for the short PUCCH is configured at a boundary between the long PUCCH and the short PUCCH.

3. The method of claim 1, wherein the first transient period is configured within one symbol, which is positioned at a boundary between the long PUCCH and the short PUCCH and corresponds to the long PUCCH.

4. The method of claim 1, wherein the first transient period and the second transient period are not configured in a symbol duration of the short PUCCH.

5. The method of claim 1, wherein the first transient period is a transient period for a start of transmission ON power of the short PUCCH, and wherein the second transient period is a transient period for an end of the transmission ON power of the short PUCCH and the second transient period are not configured in a symbol duration of the short PUCCH.

6. A user equipment (UE) for transmitting an uplink signal to a base station (BS) in a wireless communication system, the UE comprising:

a transmitter; and a processor, operative connected with the transmitter, wherein the processor is configured to:

configure a long physical uplink control channel (PUCCH) of 4 or more symbols with first uplink control information (UCI);

configure a short PUCCH of 1 or 2 symbols with second UCI; and control the transmitter to transmit the long PUCCH and the short PUCCH, wherein the transmissions of the long PUCCH and the short PUCCH are consecutive and the long PUCCH is followed by the short PUCCH in a time domain, wherein a first transient period for starting the transmission of the short PUCCH is configured only in the long PUCCH, and wherein a second transient period for ending the transmission of short PUCCH is configured outside of the short PUCCH.

7. The UE of claim 6, wherein a starting point for transmitting the short PUCCH is configured at a boundary between the long PUCCH and the short PUCCH.

8. The UE of claim 6, wherein a starting point for transmitting the short PUCCH is configured at a boundary between the long PUCCH and the short PUCCH.

9. The UE of claim 6, wherein the first transient period and the second transient period are not configured in a symbol duration of the short PUCCH.

10. The UE of claim 6, wherein the first transient period is a transient period for a start of transmission ON power of the short PUCCH, and wherein the second transient period is a transient period for an end of the transmission ON power of the short PUCCH and the second transient period are not configured in a symbol duration of the short PUCCH.

* * * * *